(12) United States Patent
Mansuino

(10) Patent No.: US 7,797,949 B2
(45) Date of Patent: Sep. 21, 2010

(54) DEVICE FOR MOULDING FOOD SUBSTANCES

(75) Inventor: Sergio Mansuino, Mondovi (IT)

(73) Assignee: Soremartec S.A., Arlon (BE)

( * ) Notice: Subject to any disclaimer, the term of this patent is extended or adjusted under 35 U.S.C. 154(b) by 761 days.

(21) Appl. No.: 10/598,582

(22) PCT Filed: Jan. 14, 2005

(86) PCT No.: PCT/IB2005/000124
§ 371 (c)(1), (2), (4) Date: Sep. 5, 2006

(87) PCT Pub. No.: WO2005/092111
PCT Pub. Date: Oct. 6, 2005

(65) Prior Publication Data
US 2007/0163268 A1 Jul. 19, 2007

(30) Foreign Application Priority Data
Mar. 5, 2004 (EP) .................................. 04425150

(51) Int. Cl.
*F25B 21/02* (2006.01)
(52) U.S. Cl. .......................................... 62/3.2; 62/380
(58) Field of Classification Search .................... 62/3.2, 62/3.63, 380; 264/324, 478; 99/450.2, 450.6; 426/245, 279, 280, 512; 198/330, 354, 369.3, 198/369.7
See application file for complete search history.

(56) References Cited

U.S. PATENT DOCUMENTS

| | | | |
|---|---|---|---|
| 3,188,983 A | | 6/1965 | Tomberg |
| 3,192,726 A | * | 7/1965 | Newton ........................ 62/3.63 |
| 5,029,446 A | * | 7/1991 | Suzuki .......................... 62/3.6 |
| 5,101,714 A | * | 4/1992 | Grandi ......................... 99/335 |
| 6,092,388 A | | 7/2000 | Waldstrom |
| 6,299,818 B1 | * | 10/2001 | Hawkinson .................. 264/478 |
| 6,735,959 B1 | * | 5/2004 | Najewicz ..................... 62/3.63 |

FOREIGN PATENT DOCUMENTS

| | | |
|---|---|---|
| DE | 10019297 A1 | 11/2000 |
| EP | 0745466 A1 | 12/1996 |
| FR | 2574253 A1 | 6/1986 |
| FR | 2574253 A1 | 6/1988 |
| FR | 2729278 A1 | 7/1996 |

(Continued)

OTHER PUBLICATIONS

English Translation of Japanese Office Action from JP2007-501360; 2 pages.

*Primary Examiner*—Mohammad M Ali
(74) *Attorney, Agent, or Firm*—Rothwell, Figg, Ernst & Manbeck, P.C.

(57) ABSTRACT

A device for molding foodstuff masses comprises:
one or more molds (14) provided with sockets (16) which define pouring cavities;
inserts (22) made of thermally conductive material associated, in a relationship of heat exchange, with the pouring cavities (16); and
thermal-conditioning units (24), such as Peltier cells, associated to the inserts made of thermally conductive material (2).

There is present a control unit (34) for generating signals for control of the thermal-conditioning units (24) so as to provide cycles of thermal treatment of the material undergoing selectively pre-determined pouring.

A preferential application is in the sector of the confectionery industry.

19 Claims, 3 Drawing Sheets

FOREIGN PATENT DOCUMENTS

| | | |
|---|---|---|
| JP | 572643 A | 1/1982 |
| JP | 62195877 A | 8/1987 |
| JP | 62195877 A1 | 8/1987 |
| JP | 06303907 A | 11/1994 |
| JP | 09117916 A | 5/1997 |

\* cited by examiner

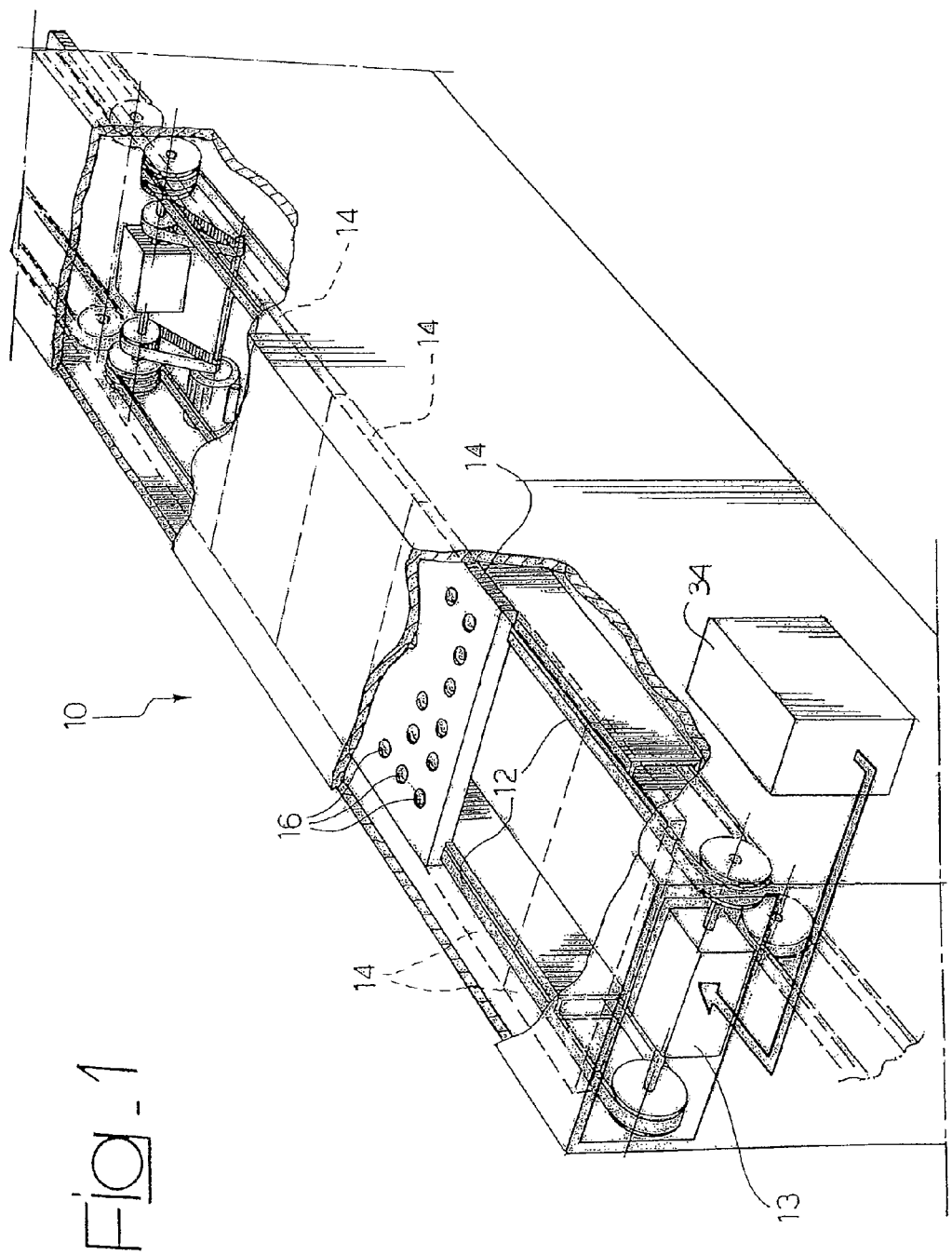

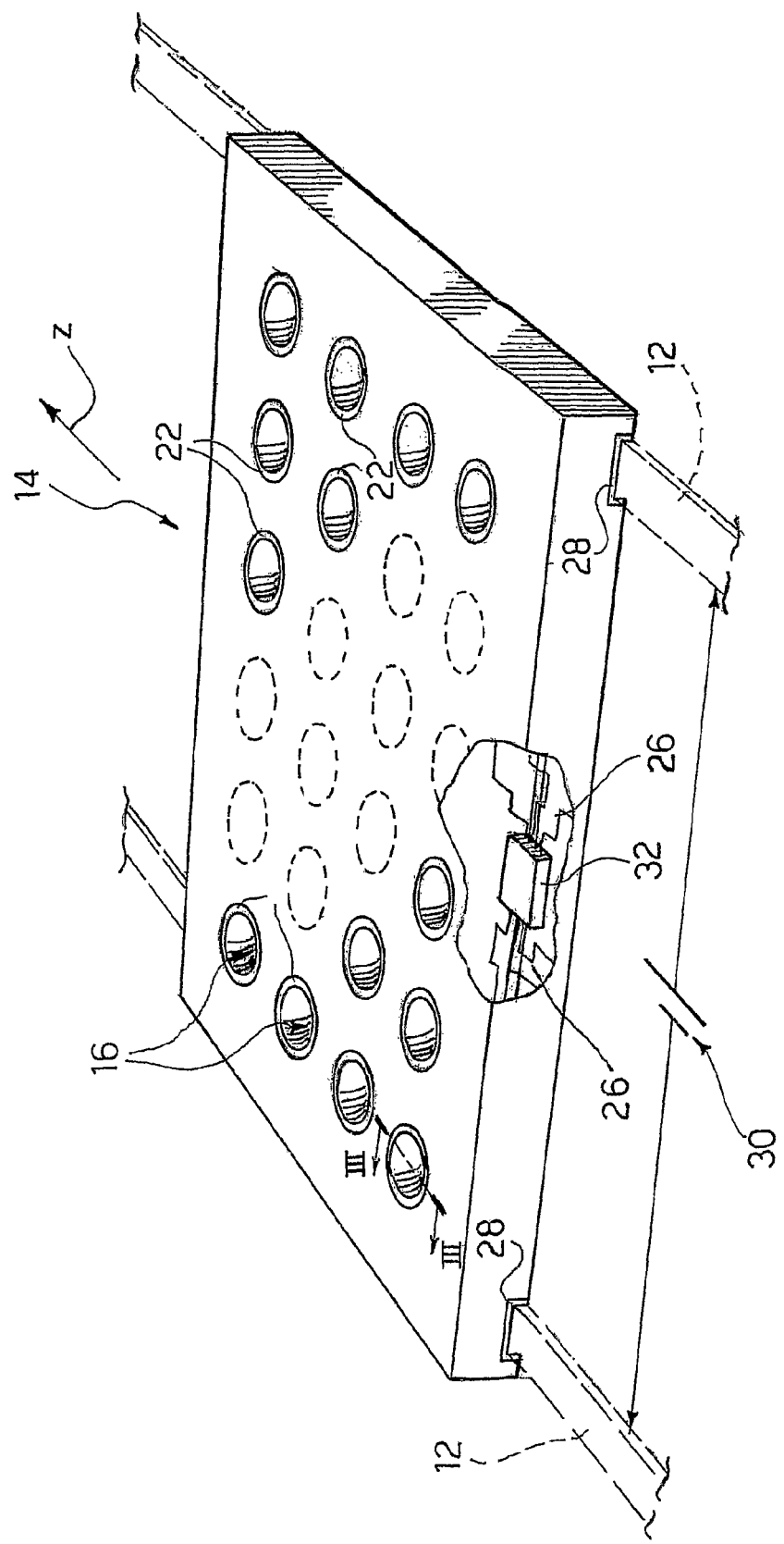

7,797,949 B2

DEVICE FOR MOULDING FOOD SUBSTANCES

CROSS REFERENCE TO RELATED APPLICATION

This application is a 35 U.S.C. §371 National Phase Entry Application from PCT/IB2005/000124, filed Jan. 14, 2005, and designating the United States.

The present invention relates to techniques for moulding food substances and has been developed with particular attention paid to its possible application to the moulding of articles made of chocolate.

Of course, the reference to this possible field of application should not be understood in a sense that might in any way limit the scope of the invention, which is altogether general.

Furthermore, the term "chocolate" is herein used to indicate any substance that may be identified as chocolate on the basis of its rheological characteristics. This fact is irrespective of whether the substance in question can be termed chocolate or not in compliance with standards on the composition of foodstuffs. These standards may, in fact, if necessary, undergo modification as a result of the intervention of standards authorities, whilst the same evidently does not apply to the rheological characteristics of the product itself.

The moulding of foodstuffs usually envisages that the substance, initially in the fluid state (this also comprises of course the liquid state) and at a given temperature, is poured into a mould of any type and nature and is then consolidated with the passage to a lower temperature.

The effect of consolidation can be achieved as a result of pure and simple exposure to room temperature. In the food industry recourse to plants and equipment in which cooling is at least accelerated via a refrigerating action is, however, prevalent.

For example, in the confectionery industry there is a widespread use of cooling tunnels: the moulds in which the foodstuff substance has been poured are made to advance through the tunnel, which, as a result of the connection to a refrigerating source, it is kept at a generically low temperature. Exposure to said temperature accelerates the process of cooling of the substance poured into the moulds, which can thus reach at a higher rate the temperature of consolidation (crystallization of the fatty phase), which enables, in ultimate analysis (with an action commonly referred to as "demoulding"), extraction from the moulds of the articles formed therein.

However widespread, this solution suffers from three basic drawbacks.

In the first place, the cooling process carried out in said tunnel has a rather low energy efficiency. The refrigerating action is obtained in fact chiefly in regard to the atmosphere within the tunnel (consisting usually of environmental air, possibly filtered and purified). This atmosphere in itself presents characteristics of thermal insulator and moreover presents low capacity of heat exchange with the substance that is placed in the moulds. In many cases, the heat exchange with said substance takes place prevalently through the free surface of the mass poured into the moulds; very frequently, in order to meet requirements of lightness and ease of maintenance, the moulds are made of plastic material, with good characteristics of thermal insulation.

A second drawback is represented by the fact that the stay time of the moulds within a cooling tunnel is dictated chiefly by the time necessary for the poured substance to pass from the pouring temperature to the temperature of consolidation which makes it possible to proceed to the next step or to the demoulding step. All the other parameters being equal, this interval is of a practically fixed length. It follows that, as the speed of advance of the pouring moulds (normally inserted in a production plant which, for requirements of efficiency of use, tends to be made to function as fast as possible) increases, the longitudinal dimensions of the tunnel increase accordingly.

The above dimensions can easily reach quite considerable values, which, as the speed of advance of the products increases, are increasingly difficult to bring into line with the limitations in terms of space existing not only in small-sized or medium-sized production facilities, but also in production plants of the major firms present in the food industry.

A third drawback is represented by the fact that, with the traditional solutions mentioned previously, the process of cooling of the substances poured into the moulds is not precisely controllable. It is clear that, by increasing the amount of refrigerating energy applied to the cooling tunnel, it is possible to speed up the cooling process. It is, however, difficult—and indeed impossible—to impose specific cooling curves on the masses that are present in the moulds.

There are, on the other hand, known in the art solutions that to a certain extent move in the direction of overcoming the drawbacks outlined above.

For example, in U.S. Pat. No. 4,324,108 an apparatus is described for making frozen foodstuffs (for example ice lollipops) in which a plurality of moulds are made to advance over a tube-type heat exchanger. There is envisaged the presence of mechanical seals between adjacent moulds so as to enable spraying of a coolant against the bottom surface of the moulds, preventing this material from possibly contaminating the foodstuff substance that is poured.

A solution, which is to a certain extent akin to the above, is described in U.S. Pat. No. 4,583,375, where there is illustrated the production of foodstuffs, which, however, have a consistency of their own such as to enable their direct conveyance by the top branch of a belt conveyor.

Yet another forced-cooling mechanism, implemented via a cooling gas projected on the products, is described in FR-A-2 530 421. Irrespective of any other consideration, in order to prevent an undesirable contamination of the products, in this application it is necessary to use a coolant vehicle of a quality compatible with the foodstuffs, such as liquefied nitrogen gas, with all the operating difficulties that this entails.

From the document EP-A-0 429 969 there are then known moulds for the pouring of masses of chocolate that are arranged for the passage of a coolant aeriform flow underneath the bottom surface of the moulds; the document in question does not provide further details on the concrete modalities of embodiment of said cooling action.

In order to complete the review of the prior art, it is possible to cite yet further documents, such as EP-A-0 589 820 and EP-A-0 914 776, which envisage the use, for the moulding of articles made of chocolate, of an assembly formed by a mould and a counter-mould in which there is made to circulate a "supercooled" means. Irrespective of any other consideration linked to the circulation of said super-cooled means, the solution described in said prior documents is intrinsically limited to the moulding of thin-shelled articles.

All the solutions illustrated in the prior documents cited above can contribute to improving to a certain extent the energy efficiency of the cooling process and possibly to providing cooling stations of smaller dimensions as compared to the refrigerating tunnels of a traditional type.

In any case, in a way independent of said possible improved contribution, these solutions do not enable in any way precise control of the cycle for cooling the substance poured into the moulds.

Once again, these known solutions leave various aspects unsolved that may assume a particular importance in the food industry, above all in the presence of very high production flows. Just to name one of these problems, it is important to see that the moulds can be periodically removed from the moulding plant in order to undergo maintenance operations (for example, washing to eliminate the residues of product) with the possibility of being replaced with other moulds that have just been cleaned, without this involving any need to stop the equipment of the production cycle. It is perfectly evident that solutions in which the moulds have to be necessarily mounted on the corresponding apparatus in a fixed way or, in any case, so as to be removable only with considerable difficulty, are far from suited to a really satisfactory use, taking into account the fact that the widely used moulding plants normally envisage that the moulds can periodically undergo cleaning.

The purpose of the present invention is to provide an apparatus that is able of to overcome completely all the reasons of difficulty and criticality highlighted above with reference to the previously known solutions.

According to the present invention, said purpose is achieved thanks to a device having the characteristics recalled specifically in the ensuing claims.

In particular, a currently preferred embodiment of the invention envisages associating to the cavities (sockets) present in the mould independent and modulatable refrigerating units, such as Peltier-effect units.

The application of Peltier units to moulding units is in itself known, for example, from U.S. Pat. No. 3,804,362. The apparatus described in said prior document is designed for moulding plastic materials and, owing to its intrinsic structure, is not suited for use in a plant for the continuous production of foodstuffs.

The invention will now be described, purely by way of non-limiting example, with reference to the annexed drawings, in which:

FIG. 1 is a general perspective view of an apparatus that implements the invention;

FIG. 2 is a view in detail of one of the moulds of the apparatus illustrated in FIG. 1, said mould being represented together with some of the elements associated thereto;

Figure 4:
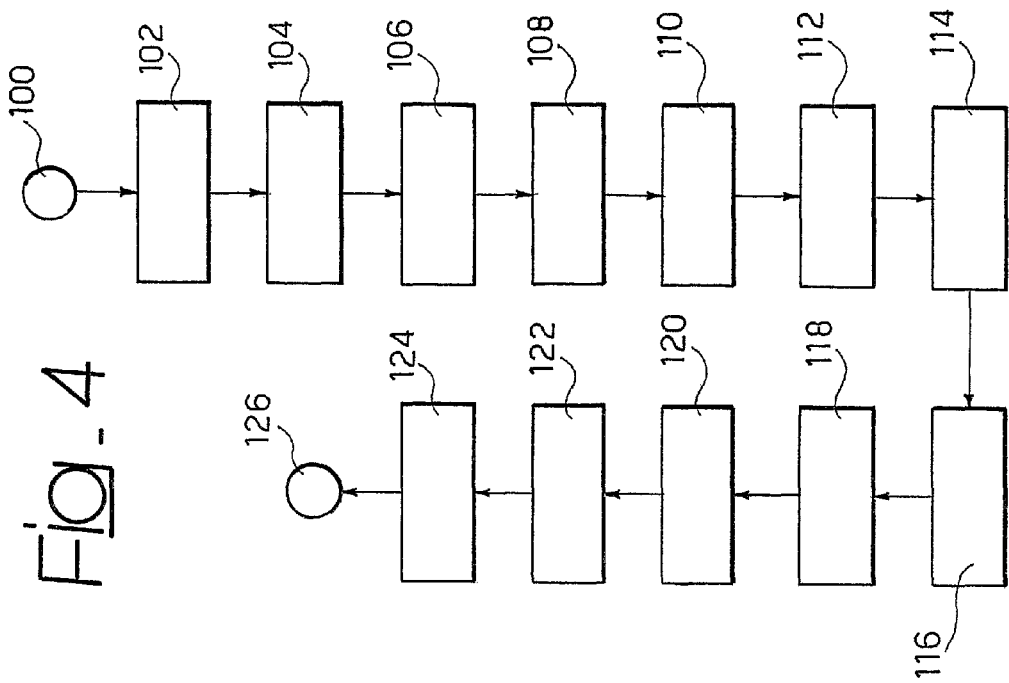
FIG. 4 is a flowchart representing a cycle of heat treatment that may be implemented with the apparatus of FIGS. 1 to 3.

In FIG. 1, the reference number 10 designates, as a whole, an apparatus (the so-called "moulder"), which can be used for moulding food substances, such as chocolate.

In its essential terms, the apparatus 10 illustrated herein (by way of example, of course) reproduces the structure of moulders already known in the art, as may be inferred for example from EP-A-0 083 324, EP-A-0 583 739, EP-A-0 583 740, EP-A-0 736 257, EP-A-0 766 922, EP-A-0 945 070, all of said documents being assigned to the present applicants.

Basically, the moulder 10 in question is represented by a conveyor of the type comprising a motor-driven loop-type chain 12 driven by a motor 13 and designed for supporting and feeding the moulds 14.

In the exemplary embodiment illustrated herein—which is indeed purely an example, the moulds 14 substantially resemble rectangular trays in which there is present a plurality of pouring cavities or sockets 16 (in which the fluid foodstuff substance is deposited) herein represented with a hemispherical shape, but they may have any shape.

The moulds 14 could be hinged in a so-called mould-holder in the case of a solution with fixed moulds. The exemplary embodiment illustrated herein envisages, instead, in accordance with the solution described in EP-A-0 583 740, that the moulds 14 are simply pushed by the motor-driven formations 12, thus providing a so-called free-mould solution. It will be appreciated that, in both cases, the moulds 14 can be conveniently removed and re-inserted in the moulder 10, without necessarily involving any stoppage of the operation thereof.

As has already been said, moulders which have the above general structure are amply known in the art, such as to render any detailed description herein superfluous.

This applies also as regards the criteria that regulate the movement of advance of the moulds 14. Usually this movement is continuous, with the provision of associated equipment (designed to enable, for example, depositing of the substance, possible filling of the articles poured, moulding, etc.) obtained with the capacity of "following" the moulds 14, i.e., enabling the apparatus that each time operates on the moulds 14 to translate therewith so as to operate in conditions of absence of relative movements with respect to the products P themselves.

Once again for reasons of simplicity of illustration, it will be initially assumed that the products P are chocolates obtained from at least one compact mass of chocolate poured into sockets 16 of the moulds 14.

The reference to this specific modality of application is simply designed to simplify the illustration and understanding of an exemplary embodiment of the invention. The persons skilled in the art will promptly understand that in reality the operation of pouring into moulds 14 can be performed in a number of steps.

For example, there may be envisaged a step of pouring of a first foodstuff mass within the sockets 16, followed by a so-called operation of dripping (aimed at leaving within the moulds just a shell of chocolate or foodstuff substance adherent to the walls of the cavities of the mould) and again by one or more operations of pouring, designed for example to form within the shell of the product one or more filling masses.

From the detailed view of FIG. 2 it may be noted that, in a preferred embodiment, the moulds 14 are in themselves obtained with a mass of thermally insulating material (for example, plastic material), in which, in a position corresponding to the sockets 16 (hence a position corresponding to the walls of the mould cavities) are placed inserts 22 made of thermally conductive material, such as metal material: this is usually metal material of the type approved for use in contact with foodstuffs.

It may be noted that the one illustrated represents only one of the many possible embodiments of the solution described herein.

In particular, the example to which reference is made herein envisages that each of the sockets 16 will be, in effect, defined by a respective insert 22. This means that the various inserts 22 are insulated from one another by the mass of plastic material (with characteristics of thermal insulation) constituting the body of each mould 14.

Other possible embodiments of the solution described herein envisage that the mould 14 as a whole is made of thermally conductive material.

Once again, it is possible to consider that groups or blocks of sockets 16 are defined by a single insert made of thermally conductive material, which defines, for example, totally or in part, a row, or else a column, or else an area of sockets 16 of the mould 14.

The terms "row" and "column" evidently refer to the fact that, in the example illustrated herein, the sockets 16 are arranged on the mould 14 according to a general matrix distribution, so that rows and columns indicate arrays of sockets 16 aligned in the direction of the width or else of the length of the mould (viewed in the direction of advance, generically designated by z, of the mould 14 itself).

Albeit not imperative, the solution illustrated herein (each socket 16 defined by a respective insert 22) is currently considered as preferred.

The reasons for this are different, as described in what follows.

In the first place, this solution enables minimization of the volume of thermally conductive material used (according to the modalities described in greater detail in what follows) for the heat exchange and hence for the cooling of the masses of foodstuff substance that are placed in the sockets 16.

By adopting this solution, the refrigerating action is obtained exclusively in an area corresponding to a small volume that surrounds the cavities or sockets 16 of each mould 14. In this way, refrigeration of the mould 14 as a whole is avoided, thus cooling only masses of thermally conductive material that in actual fact play just a minor role, if indeed no role at all, for the purposes of heat exchange with the substance poured into the moulds 14.

Even though the inserts 22 have been illustrated herein (see in particular FIG. 3) such as to extend practically over the entire surface of the cavities of the sockets 16 of the mould 14, such a solution is not in the least imperative. Comprised, of course, in the scope of the present invention are solutions in which the inserts 22 extend only over a part (for example a polar part, or else an equatorial part, or else over spherical wedges of the surface of the socket cavities 16.

Once again, the exemplary embodiment illustrated herein envisages that the inserts 22 will define directly the mould cavity (i.e., the socket). There may, however, be envisaged embodiments in which the cavity of the pouring socket 16 is not defined directly by the insert, but by a layer made of intermediate material, set on top of the body of the insert.

Figure 3:
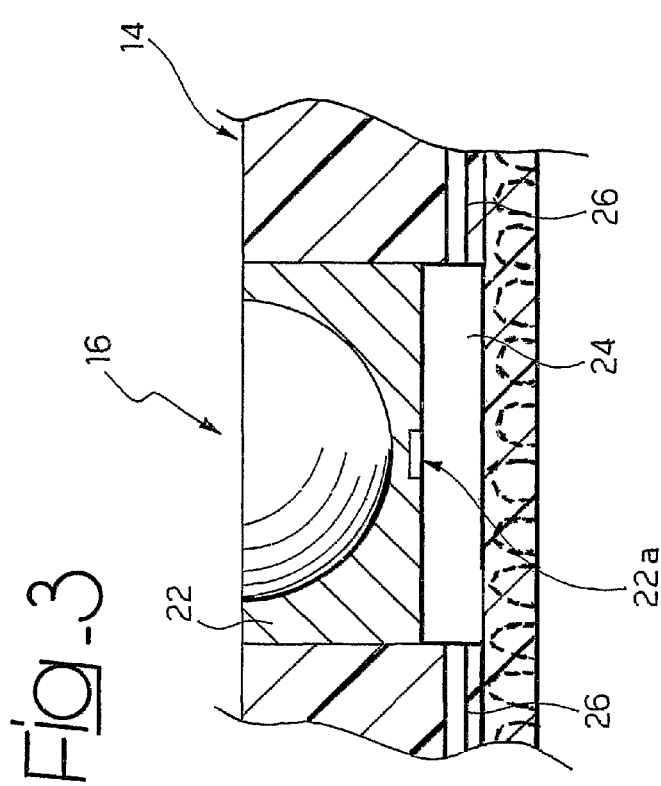
FIG. 3 is a cross-sectional view according to the line III-III of FIG. 2.

Just to provide an example, and with reference to the representation of FIG. 3, it is possible to hypothesize embodiments in which the cavity of the insert 22 is coated with a layer made of material (for example thermo-insulating material) which itself also defines the pouring cavity.

The layer of insulating material in question can be represented, for example, by a wafer shell in which the chocolate is poured: in this regard, it is sufficient to refer to the description and figures of EP-A-0 083 324.

For the above reason, the ensuing claims make general reference to an insert 22 made of thermally conductive material—associated, in a relationship of heat exchange—with at least part of the surface of the pouring cavity.

Quite simply, for the purposes of the embodiment of the invention, it is not necessary for the insert 22 to define itself the pouring cavity 16: it is, in fact, sufficient for the insert to be able to co-operate, in a relationship of heat exchange, with the pouring cavity, it being possible to absorb or yield heat with respect to the mass poured into the cavity.

As has already been said, the hemispherical shape of the sockets 16, illustrated herein by way of example, is not in any way imperative: the sockets 16, and hence the inserts 22, may thus have any shape at all according to the shape that is it is intended to impart on the articles or products obtained by pouring.

Another advantage linked to the use of distinct inserts 22, one for each socket 16, is related to the fact of being able to "drive" the cooling of the foodstuff mass that is placed in a given socket 16 in a way that is altogether independent of the other sockets 16.

This possibility can be exploited, for example, in the case where adjacent sockets 16 are designed to be used for the pouring of different substances (for example, milk chocolate and bitter chocolate, substances the temperatures of pouring of which differ from one another).

As may be seen more clearly from FIG. 3, associated to each insert 22 is a respective cooling/refrigerating unit 24 consisting, in the currently preferred embodiment of the invention, of a respective Peltier-effect cell.

Thermo-electrical cells of the aforesaid type find an increasingly frequent use in various technical sectors, for example for manufacturing portable refrigerators and, above all (by making Peltier units 24 of very small dimensions and very low energy absorption), for thermal conditioning (both in the sense of cooling and in the sense of possible heating) of electronic or opto-electronic components, such as, for example, laser sources.

By simply modifying the mode of supply, a Peltier cell 24 can be in fact converted from performing a cooling action to performing a heating action. This thus makes it possible to bestow upon the unit 24 the characteristics of a thermal-conditioning unit in the widest sense of the term.

In an altogether similar way to what has been said previously in regard to the inserts 22, it is possible to use a respective cooling cell 24 for each socket 16, or else associate to a number of sockets 16 a single cooling cell 24, or again associate to a single socket 16 a number of cells 24.

In this regard, there apply to a fair extent the same considerations made previously as regards the possibility of associating to each socket 16 a respective insert 22, or else the possibility that a given insert 22 will define a plurality of sockets 14, or again the possibility that a number of inserts 22 will define a single socket 16.

As regards the cells 24, the fact of associating to each socket 16 a respective cell 24 has the further advantage represented by the fact that, in the case of faulty operation of a given cell 24, the possible negative effect is felt uniquely in relation to the product that is being formed in the respective socket 16. Evidently, in the case where a given cell 24 is designed to serve a number of sockets 16, the faulty operation thereof makes its possible negative effects to be felt not only on a product, but even on a plurality of products.

In a particularly preferred way, the cells 24 are made in such a way as to be in effect embedded in the structure of the mould 14. Recourse to this solution does not raise difficulties of any sort, precisely on account of the extensive experience acquired in the use of said cells for the thermal conditioning of electronic or opto-electronic products.

The fact that the cells 24 are embedded in the structure of the mould 14 (which is usually made of plastic material) means that each mould 14 can be removed from the apparatus 10 and sent on—when the need arises—to a cleaning or maintenance cycle.

This may be, for example, a washing cycle that can be implemented, according to known and widely adopted criteria for the normal moulds made of plastic material or else metal, without this adversely affecting in any way the cells 24 themselves.

Likewise embedded in the body of the mould 12 (benefiting in this way fully from the fact that said body is usually made of a thermally insulating—and electrically insulating—material) are the electrical-supply tracks or strips 26 which connect the cells 24 to a primary supply such as, for example, a contact formation 28 that emerges on the surface (usually on the underside) of the moulds 14.

The formations 28 can thus come into contact with electrical-supply conductors coming under an electrical-supply source 30 (which is represented schematically in FIG. 2 and which may in effect be incorporated in or associated to the motor-power drive 13).

In the exemplary embodiment illustrated, the aforesaid electrical-supply conductors may be simply made up of the same loop-like drawing structures 12 that move the moulds 14.

Hence, in addition to functioning as drawing elements, said structures 12 may also function as electrical-supply structures. In particular, the flexible drawing elements 12 may be made (totally or at least in part) in the form of electric conductors. Supply of the Peltier cells is usually at a low voltage, so that the solution described for the electrical supply proves in fact ideal for the proposed application.

Of course, it is possible to resort, in the same context, to other forms of supply (for example with sliding blocks or contacts) of current use in the art.

In a preferred way, embedded inside the body of each mould 14 (according to criteria substantially akin to the ones adopted for the cells 24) is a processing device 32 such as a microprocessor or a microchip of the type of the ones commonly used in the so-called "smart cards".

The device 32 is able to control selectively the Peltier cells 24 associated to the various inserts 22 (hence to the various sockets 16) according to control instructions sent by a control unit 34 (consisting, for example, of a so-called Programmable Logic Controller or PLC or else by a personal computer for industrial use) in such a way as to control the Peltier cells selectively to vary selectively the temperatures at which they are in the course of the process of mould pouring.

This solution facilitates considerably the performance of an action of selective control of the various cells 24.

In fact, the control unit 34 can send the control instructions to the microchips 32, which control the operation of each mould using the same conductors 12 through which the voltage is applied (source 30) in order to enable supply of said cells.

In particular, the control signals in question can be transmitted by the unit 34 to each microchip 32 in the form of encoded impulsive signals superimposed on the supply voltage.

The drawing elements 12 hence perform, in addition to their specific function and to the function of electrical-supply conductors for transferring the supply voltage to the moulds 14, also the function of buses for transferring selectively the control instructions from the unit 34 to the individual microchips 32.

This is preferably obtained using an encoding protocol such as to enable each microchip 32 to recognize and interpret correctly the control signals destined thereto and then regulate operation of the cells 24 of the mould accordingly.

In particular, each microchip 32 is able to control the cells 24 mounted on "its own" mould according to the same criteria commonly adopted in other current applications of Peltier cells which have already been mentioned previously.

For example, by resorting to a criterion of pulse modulation of the PWM type (i.e., of regulation of the duty cycle of the supply pulses), it is possible to regulate the modalities and the power of the electrical supply to the individual cells and, accordingly, the temperature to which the various inserts 22 are brought.

This action of regulation of the temperature (both in the sense of cooling and in the sense of heating) can be achieved with high precision. For example, it is possible to resort to a feedback scheme, with the application, on each insert 22, of a thermometric sensor 22a, which generates a signal indicating the temperature of the corresponding insert 22 and transmits said signal to the microchips 32 in view of processing thereof.

The solution described herein enables moulds 14 to be obtained which may be qualified as true "smart" moulds, in which the temperature of the sockets 16 can be regulated (if necessary, in an independent way for each socket or even in a modulated way in the context of the single socket) according to control signals issued by the control unit 34. Added to this is the possibility of obtaining, thanks to a feedback-control mechanism, an extremely precise and rapid regulation of the effective actuation of said controls.

The solution that has just been described, which envisages inserting a processing unit (e.g., a microchip 32) within each mould 14 enables the maximum flexibility in the thermal control of the individual sockets to be achieved.

This solution is not however imperative.

In the majority of current applications, it is in fact sufficient to be able to control the temperature of the sockets 16 in such a way that all the sockets located on a given mould 14 are substantially at the same temperature. This result can be achieved conveniently by providing one or more processing/control units located on the outside of the moulds (for example, set in fixed positions on the framework of the moulder) so as to be able to supply in a similar way (for example, via sliding blocks and/or contacts such as the ones described previously) the Peltier-effect unit associated to all the sockets of a mould.

Whatever the specific solution adopted of the ones described previously, by way of example, it is possible to implement in a thermal cycle referred to the temperature imparted on a given socket 16 in the course of the advance through the apparatus 10, an advance that will be assumed ideally as taking place from the bottom upwards and from left to right, as viewed in FIG. 1.

Specifically, it is possible to envisage implementation of the cycle represented by the flowchart of FIG. 4. It is evident that the cycle described herein is provided purely by way of example and aims principally at illustrating the potentialities of the apparatus described herein.

The values of temperature that will be mentioned are hence provided purely by way of example and may vary, even to a very wide extent, according to the characteristics of the product that is being moulded (for example, according to the type of chocolate considered, e.g., bitter chocolate, milk chocolate, white chocolate, etc.).

Starting from a start step designated by 100, in a step 102 the temperature of the sockets 16 is brought to a value in the region of 24-27° C. Usually said thermal conditioning involves a heating action which the Peltier cells 24 are capable of performing conveniently precisely on account of their reversibility from a cooling function to a heating function.

Once reaching of the aforesaid temperature is verified, the cells 24 are usually de-activated (step 104) to enable pouring of the chocolate into the mould 14 each time involved.

The operation of pouring, represented in step 106, can then be performed in ideal conditions, with a highly precise control of the temperature. The operation of pouring is followed by other operations, such as, for example, the beating (vibration) of the mould 14 to eliminate any possible air bubbles withheld in the poured mass (step 108) and a dripping/rolling operation to eliminate the dripping waste (step 110).

The operations mentioned with reference to the steps 106, 108 and 110 are performed according to criteria and with the use of equipment that are not illustrated herein but are well known in the art, and are hence such as not to require any detailed description herein.

Subsequently, in a step designated by 112, the cells 24 are activated in their function of refrigerating elements so as to bring the temperature of the inserts 22 to the value necessary for bringing about hardening of the shell of chocolate poured into the mould. This is typically a temperature in the region of 22-23° C.

A this point, the cells 24 can be once again de-activated to proceed to further operations, such as, for example, pouring of a filling mass (step 114) and a new beating/vibration of the mould 14 to eliminate the air bubbles and to settle the filling (step 116).

Also in the case of the operations recalled in steps 114 and 116, these are operations well known in the art, performed according to known criteria and with known equipment, such as not to require any; detailed description herein.

At this point, the cells 24 are once again activated (step 118) for cooling the ensemble of the substances that are placed in the sockets 16 (chocolate shell and filling poured therein) to a temperature of hardening of the filling in the region of, for example, 21-23° C.

The cells 24 are then once again de-activated for performing further operations such as surface heating with infrared lamps (step 118), pouring of the bottom or lid of the product with the filling (step 120), beating/vibration and scraping (step 122). Once again, these are well known operations, performed according to criteria and with equipment that are well known in the sector.

Finally, in a step 124, the Peltier cells are once again activated for achieving a more marked cooling so as to reach the temperature of demould of the product (typically in the region of 7-11° C.).

At this point, the individual treatment cycle is concluded with a final step designated by 126 and corresponding to the output of the moulds from the treatment area. Once this final step is reached, the cells 24 are once again de-activated so as to enable repetition of a new treatment cycle according to the modalities described previously.

Before being brought back to the start of the treatment path, the moulds 14 may possibly undergo cleaning and washing treatments, which, for the reasons described previously, do not have adverse consequences either on the cells 24 or on the microchips 32 possibly embedded in the body of the mould 14.

After demoulding of the products and during the return path from the output end of the moulder 10 to the entrance of the moulder itself, the moulds 14 may possibly undergo a heating action aimed at speeding up the step of heating indicated in step 102. This (pre)heating can take place either by specifically activating the cells 24, or else by exploiting, at least in part, the dissipation heat generated on the "hot" side of the cells 24 which in the meantime are performing a cooling action on the sockets 16 of the moulds advancing along the "active" stretch of the moulder.

This result can be obtained by envisaging, in the context of the moulder 10, a path of return backwards of the "demoulded" moulds 14 that is as close as possible to the path of movement of the moulds in which the pouring process described previously is being performed. This enables exploitation of the air that has been heated by making it to lap, as cooling air, against the hot side of the Peltier cells. In order to improve the effect of heat exchange, this side of the cells (see once again FIG. 3) is made of thermally conductive material and/or has usually a finned profile, as represented schematically in FIG. 3.

Of course, without prejudice to the principle of the invention, the details of construction and the embodiments may vary widely with respect to what is described and illustrated herein, without thereby departing from the scope of the invention, as defined by the annexed claims.

The invention claimed is:

1. A device for moulding foodstuff masses, comprising:
a mould (14) provided with a plurality of sockets (16) which define respective pouring cavities;
at least one insert (22) made of thermally conductive material associated, in a heat-exchange relationship, with said pouring cavity (16);
at least one thermal-conditioning unit (24), associated to said insert made of thermally conductive material (2);
a conveying structure (12,13) for moving a plurality of said moulds (14) along a path of movement; and
a control unit (34) for generating control signals of said thermal-conditioning unit (24) according to a cycle (100 to 126) selectively predetermined for the thermal treatment of the material undergoing moulding in the course of the advance along said path,
wherein said mould (14) has electrical contact elements (28) which emerge on the outer surface of the mould (14) itself for the electrical supply of said at least one thermal-conditioning unit (24) and said electrical contact elements (28) have a slider conformation, so as to enable the electrical supply of said at least one conditioning unit (24) during movement of said mould (14) along a path of movement.

2. The device according to claim 1, characterized in that said at least one insert (22) made of thermally conductive material defines at least part of the surface of said pouring cavity (16).

3. The device according to claim 1, characterized in that said thermal-conditioning unit (24) is a refrigerating unit.

4. The device according to claim 1, characterized in that said thermal-conditioning unit (24) is a Peltier cell.

5. The device according to claim 1, characterized in that said thermal-conditioning unit (24) is stably associated to said mould (14).

6. The device according to claim 5, characterized in that said thermal-conditioning unit (24) is incorporated in said mould (14).

7. The device according to claim 1, characterized in that said mould (14) has a body made of thermally insulating material.

8. The device according to claim 1, characterized in that at least some of the sockets (16) of said plurality have associated thereto an insert made of thermally conductive material (22) common to a number of sockets (16).

9. The device according to claim 1, characterized in that at least one set of sockets (16) of said plurality has associated thereto thermal-conditioning units (24) that are distinct from one another.

10. The device according to claim 1, characterized in that at least some sockets (16) of said plurality have associated thereto a thermal-conditioning unit (24) common to a number of sockets (16).

11. The device according to claim 1, characterized in that said mould (14) has contact elements (28) which emerge on the outer surface of the mould (14) itself for the electrical supply of said at least one thermal-conditioning unit (24).

12. The device according to claim 1, characterized in that said conveying structure comprises drawing elements (12) at least in part configured as lines for the electrical supply of said at least one thermal-conditioning unit (24) through said contact elements (28).

13. The device according to claim 1, characterized in that said mould (14) carries associated thereto a processing unit (32) for controlling operation of said at least one thermal-conditioning unit (24).

14. The device according to claim 13, characterized in that said processing unit (32) is stably associated to said mould (14).

15. The device according to claim 14, characterized in that said processing unit (32) is incorporated in said mould (14).

16. The device according to claim 13, characterized in that said processing unit (32) is a microprocessor, a microcontroller, or else a processing unit for smart cards.

17. The device according to claim 1, further comprising:
a processing unit (32) associated to said at least one mould (14) for controlling operation of said at least one thermal-conditioning unit (24); and
a line (12) for the transfer of said control signals from said control unit (34) to said processing unit (32) associated to said at least one mould (14).

18. The device according to claim 17, characterized in that it comprises a plurality of said moulds (14) and in that said control unit (34) is configured for transmitting encoded signals to the processing units (32) associated to the moulds (14) of said plurality, said encoding identifying selectively the mould (14) of said plurality to which a given control signal is sent.

19. The device according to claim 17, further comprising:
a conveying structure (12, 13) for moving said mould (14) along a path of movement,
wherein said line (12) coincides, at least in part, with said conveying structure.

* * * * *